United States Patent [19]

Greene et al.

[11] Patent Number: 4,506,057

[45] Date of Patent: Mar. 19, 1985

[54] STABLE LATEXES CONTAINING PHOSPHORUS SURFACE GROUPS

[75] Inventors: Bettye W. Greene; Sun-Lin Chen, both of Midland, Mich.

[73] Assignee: The Dow Chemical Company, Midland, Mich.

[21] Appl. No.: 562,886

[22] Filed: Dec. 19, 1983

[51] Int. Cl.$^3$ .......................... C08K 5/50; C08L 9/08
[52] U.S. Cl. .................... 524/461; 526/193; 524/710
[58] Field of Search .............. 524/461, 130, 460; 526/193

[56] References Cited

U.S. PATENT DOCUMENTS

| | | | |
|---|---|---|---|
| 3,352,808 | 11/1967 | Leibowitz et al. | 524/460 |
| 3,442,880 | 5/1969 | Somers | 526/193 |
| 3,642,740 | 2/1972 | Pierce, Jr. | 526/193 |
| 3,869,418 | 3/1975 | Peterson et al. | 524/460 |
| 3,941,727 | 3/1976 | Timmerman et al. | 524/461 |
| 3,962,201 | 6/1976 | Dulog et al. | 526/193 |
| 4,091,197 | 5/1978 | Fischer et al. | 526/193 |
| 4,169,086 | 9/1979 | Nölken | 526/193 |
| 4,225,383 | 9/1980 | McReynolds | 162/156 |
| 4,233,198 | 11/1980 | Nölken | 524/130 |
| 4,290,930 | 9/1981 | Nölken | 526/193 |

FOREIGN PATENT DOCUMENTS 0004062 9/1979 European Pat. Off. ............ 526/193

Primary Examiner—Joseph L. Schofer
Assistant Examiner—N. Sarofim
Attorney, Agent, or Firm—Donald L. Corneglio

[57] ABSTRACT

A phosphorus modified latex composition useful in the coating of substrates with inorganic fillers. A latex particle having phosphorus groups intimately bound to the particle's surface formed by the emulsion polymerization of a latex with a phosphorus compound. Also a method of preparing a composite sheet and a paper coating latex with the phosphorus modified latex is provided.

20 Claims, No Drawings

STABLE LATEXES CONTAINING PHOSPHORUS SURFACE GROUPS

BACKGROUND OF THE INVENTION

The present invention relates to a modified latex containing phosphorus surface groups. This modified latex is useful as a coating for substrates and as a binder in aqueous systems containing inorganic fillers commonly employed in paper coatings, carpet backings, wallboards and other substrates.

In general mineral coatings or fillers are applied to paper to cover the individual fibers of the paper and fill interstices between fibers, thus rendering the surfaces of the paper more level and uniform in texture. Mineral coatings or fillers are also employed in aqueous dispersions of fiber to form a composite sheet. This process is described in U.S. Pat. No. 4,225,383.

In order to suitably bind the mineral coatings or fillers to the substrate, latexes are employed. Latexes bind the filler such that it will not be removed by the pull of printing ink. Besides printability, the latexes also help to influence many other qualities of the paper such as appearance and strength.

The ability of the latex to function as a binder is very important to the final quality of the finished substrate, i.e., dry and wet pick in paper coatings. Generally in the art of paper coating, the latex component is admixed with a filler in an aqueous suspension and mechanically applied to the substrate to be coated. Alternatively, in the art of composite sheet formation, a latex is added to an aqueous dispersion of fiber and inorganic filler which is destabilized to form a fibrous agglomerate which is deposited onto a screen or other porous means to form a sheet therefrom.

For various reasons, it is desirable to maximize the retention level of inorganic fillers on the substrate to be coated. One way to accomplish this is to use a latex which interacts well with the filler. Improved interaction increases retention which has the benefits of reducing the level of flocculant required to destabilize the filler from solution and of reducing the stickiness of the filler and latex to equipment which occurs when high flocculant levels are used. This, in turn, reduces the maintenance needed in the manufacture of composite sheets. The latter benefit is also realized with respect to cleaning up excess residual filler left behind in the aqueous solution by the latex after deposition. Another advantage to increasing filler retention and thereby content is, of course, economical, as higher filler content usually translates to less expensive final products.

It is well known in the art, however, that while a particular amount of filler can enhance the properties of a coated product, higher amounts can cause loss of strength due to decreased structural integrity. It, therefore, would be desirable to develop a method which increased filler retention without reducing physical properties or ideally to increase the strength of substrates with higher filler levels. Accordingly, it would be desirable to develop a latex which had improved interaction with inorganic fillers to enable better retention of the fillers which, in turn, deposit themselves on a substrate to be coated, with little or no reduction in strength.

SUMMARY OF THE INVENTION

The present invention provides for a modified latex composition comprising at least one ethylenically unsaturated synthetic monomer which is emulsion polymerized to form a latex and a compound containing a —PO(O)$_2$ group which is intimately bound to the surface of the latex. The compound can also comprise a mixture containing a —PO(O)$_2$ group, and an ethylenically unsaturated comonomer such as an $\alpha,\beta$-ethylenically unsaturated carboxylic acid or a derivative of a phosphonic or phosphoric acid.

The present invention further provides for a method of forming a composite sheet comprising the addition of from about 2 to about 30 percent of the modified latex composition to an aqueous dispersion of an inorganic filler and a water-dispersible fiber, colloidally destabilizing the resulting mixture to form a fibrous agglomerate in an aqueous suspension, distributing and draining the aqueous suspension on a porous support to form a wet web, and drying the web to form a sheet therefrom.

Even further, the present invention provides for a method of preparing a paper coating composition comprising the addition of from about 2 to about 30 percent of a phosphate modified latex composition comprising at least one ethylenically unsaturated synthetic monomer which is emulsion polymerized to form a latex and a mixture containing a surfactant containing a PO(O)$_2$ group and an ethylenically unsaturated comonomer. The ethylenically unsaturated comonomer can be a carboxylic acid or a derivative of a phosphonic or phosphoric acid.

DETAILED DESCRIPTION OF THE INVENTION

The modified latex of the subject invention can be employed in the formation of composite sheets or as the latex component in a latex coating composition. Generally, the modified latex is formed by using typical latex formulations and methods known in the art with the exception that a surfactant compound is emulsion copolymerized with the conventional latex monomers such that —PO(O)$_2$ groups become intimately bound to the surface of the latex particles.

Monomers suitable for the practice of this invention with regard to the latex component comprise ethylenically unsaturated synthetic monomers. The ethylenically unsaturated monomers are of the general formula CH$_2$=CHR wherein R is H, alkyl, aryl, nitrile ester, acid or halogen. The preferred monomers being styrene, butadiene, butyl acrylate and other acrylic esters, vinylidene chloride, vinyl chloride, vinyl acetate and combinations thereof.

The phosphorus containing compounds surfactant compounds employed in the practice of this invention generally comprise those compounds containing a —PO(O)$_2$ group. The preferred surfactant compounds are of the general structural formula

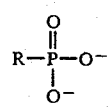

where R is an alkyl, alkylphenyl, alkylamine, fatty alcohol, fatty acid, glycol, polyglycol or the like. However, the principal constituent is the —PO(O)$_2$ group of the phosphorus containing compound; therefore, the range of phosphorus containing compounds which can be employed is large. Those latex compositions which have the —PO(O)$_2$ group intimately bound to the latex particle's surface are deemed to be within the scope of this invention. Intimately bound to the latex particle's surface would indicate by chemical or physical means (covalent bonding or adsorption) such that the —PO(O)$_2$ group is not desorbed into aqueous medium on diluting or formulating the latex with other components. Preferably the phosphorus containing group is irreversibly bound to the latex surface.

Exemplary of the phosphate surfactant compounds are derivatives of phosphoric acid; salts of phosphoric acid esters such as alkylphosphates and alkylphenyl phosphates; phosphorus-containing quaternary ammonium surfactants; phosphorus-containing fluoroalcohol based surfactants; derivatives of polyphosphoric acid such as Na$_5$R$_5$(P$_3$O$_{10}$)$_2$ where R is either 2-ethylhexyl or capryl; polymerizable phosphonic acid and phosphoric acid monomers and comonomeric modifiers such as PO(OH)$_2$CH$_2$N(CH$_2$CHCH$_2$)$_2$; free radical initiators such as K$_4$P$_2$O$_8$ (potassium peroxydiphosphate) which can give rise to bound PO(OH)$_2$ groups on the surface of the latex particles; and phosphated polyethylene oxide esters.

In general, the phosphate ester surfactant can be a mono-, di-, or tri-ester having the following general structural formulas:

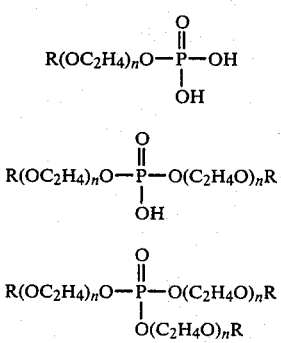

wherein R is an alkyl, alkylphenol, alkylamine, fatty acid, fatty alcohol, glycol, polyglycol or the like and n is greater than 3. One such phosphate ester family would be a phosphated nonylphenol alkoxylate; in particular, a phosphated nonylphenol ethoxylate. A suitable source of the phosphate ester is commercially available through the GAF Corporation under the trade name GAFAC®.

The GAFAC® surfactants are complex phosphate esters of nonionic surfactants of the ethylene oxide-adduct type. These anionic products are mixtures of mono- and diesters. They are soluble and compatible in solutions of electrolytes and maintain emulsifying properties over a broad pH range.

The mixture or comonomer form of the phosphorus containing compound comprises the phosphorus containing compounds as described above and a comonomer of an ethylenically unsaturated type. More particularly, the comonomer can be an $\alpha,\beta$-ethylenically unsaturated carboxylic acid such as fumaric acid, acrylic acid and the like. Additionally, the comonomer can consist of an ethylenically unsaturated derivative of a phosphonate, i.e., a derivative of the hypothetical phosphonic acid, HP(O)(OH)$_2$.

Preferably, the mixture or comonomer form of the phosphorus containing compound will contain from about 0.5 to about 5.0 percent by total weight polymer of the ethylenically unsaturated comonomer. The more preferable proportion of comonomer being from about 1.0 to about 3.0 percent by weight.

The modified latex of the subject invention is prepared such that the latex particle has —PO(O)$_2$ groups copolymerized or bound to its surface. One advantage of the copolymerized phosphorus groups, besides the obvious enhancement of latex stability, is that they are irreversibly attached to the latex particle surface and as such are not desorbed into the aqueous medium on diluting or formulating the latex with other components. This latter characteristic is particularly important inasmuch as it is this copolymerized or bound phosphate surface group which causes the desired interaction between the latex and fillers with multi-valent ions to occur.

The modified latex can be prepared by employing emulsion polymerization techniques generally known in the art. In general, the emulsion polymerization may be effected by introducing a mixture of the latex monomer(s) and the surfactant compound in appropriate proportions into an aqueous solution containing the seed, initiator and chain transfer agent. In particular, the surfactant compound comprises from about 2 to about 15 parts per hundred polymer (phr) in the total mixture. More preferably, from about 3 to about 8 phr. Whereas the latex monomer(s) may comprise from about 85 to about 98 phr and more preferably from about 92 to about 97 phr.

The emulsion polymerization of the modified latex of the subject invention can be performed using techniques generally recognized in the art. Free radical polymerization initiators can be employed, such as persulfates and peroxydiphosphates. The latter initiator is particularly useful because it provides a means to obtain the copolymerized or bound surface groups pertinent to this invention. Chain transfer agents such as carbon tetrachloride and t-dodecyl mercaptan, and seed latexes such as a styrene/acrylic acid can also be employed. The introduction of a seed latex has been found desirable to control particle size and surface area for the adsorption of the desired amount of phosphated surfactant.

The following examples are given to more clearly illustrate the preparation of the modified latex of this invention to those skilled in the art and are not for purposes of limitation. Parts are by total weight polymer.

EXAMPLE I

A modified latex was prepared from the following constituents:

|  | Parts |
| --- | --- |
| Water | 118.00 |
| Carbon tetrachloride | 4.00 |
| Sodium hydroxide (10%) | 0.15 |
| Sodium persulfate | 1.00 |
| Seed latex (styrene/acrylic acid) | 1.56 |
| Styrene | 60.00 |
| Butadiene | 40.00 |
| Phosphated alkylphenol ethoxylate | 3.00 |

After the constituents had been charged to a polymerization vessel, the resulting aqueous composition was heated to 90° C. for 45 minutes with mixing and polymerized for 4 hours. A stable phosphated latex containing 43.93 percent solids was obtained thereby.

EXAMPLE II

A modified latex was prepared with the addition of a phosphonate derivative comonomer with the following constituents:

|  | Parts |
| --- | --- |
| Water | 118.00 |
| Carbon tetrachloride | 4.00 |
| Sodium hydroxide (10%) | 0.15 |
| Sodium persulfate | 1.00 |
| Seed latex (styrene/acrylic acid) | 0.66 |
| Styrene | 56.72 |
| Butadiene | 40.00 |
| Phosphated alkylphenol ethoxylate | 2.00 |
| Phosphonate comonomer | 3.28 |

The constituents were charged to a polymerization vessel and heated to 90° C. for 45 minutes with mixing and polymerized for 4 hours. A stable latex containing 45.95 percent solids was obtained thereby.

EXAMPLE III

A modified latex was prepared with the addition of an acrylic acid comonomer with the following constitutents:

|  | Parts |
| --- | --- |
| Water | 118.00 |
| Carbon tetrachloride | 4.00 |
| Sodium hydroxide (10%) | 0.15 |
| Sodium persulfate | 1.00 |
| Seed latex (styrene/acrylic acid) | 0.66 |
| Styrene | 58.75 |
| Butadiene | 40.00 |
| Phosphated alkylphenol ethoxylate | 2.00 |
| Acrylic acid | 1.25 |

After the constituents had been charged to a polymerization vessel, the resulting aqueous composition was heated to 95° C. for 45 minutes with mixing and polymerized for 4 hours. A stable phosphated latex composition was obtained thereby.

The modified latexes as prepared above can be readily employed in paper coating and composite sheet formation. In particular, the modified latexes are useful in binding inorganic fillers as are commonly employed in paper manufacturing.

In particular, the subject latexes have found utility as binders for divalent and trivalent metal ions which are present in inorganic fillers. The inorganic fillers being present in aqueous dispersions from about 40 to about 85 percent by weight. Inorganic fillers with multivalent ions are preferred. The inorganic fillers can be chosen from those well known in the paper coating art. Especially applicable are those fillers such as clay, calcium carbonate, talc, mica, magnesium hydroxide or oxide, zinc oxide, gypsum, dolime, zincite, wallastonite, satin white, barytes, titanium dioxide, aluminum trioxide and the like.

The application of a filler and the modified latex as a binder in paper manufacture has been found to provide excellent, uniform film coverage, i.e., an even distribution of pigment and latex on the fibers, significantly lower flocculant demand, and higher wet and dry sheet strength.

Alternatively, the modified latex may be utilized as a coating on nonporous substrates such as cans and the like to prevent corrosion.

With respect to paper manufacturing, the modified latex is particularly adaptable for use as the latex component in a composite sheet method of manufacture. This product and process is described in U.S. Pat. No. 4,225,383, which is hereby incorporated by reference. Specifically, a water-dispersible fiber, a film-forming water insoluble, organic polymer such as the modified latex of this invention, from about 2 to about 30 percent, more perferable from about 3 to about 15 percent and a finely divided, substantially water-insoluble nonfibrous, inorganic filler are required to form a sheet therefrom. U.S. Pat. No. 4,225,383 additionally requires in the preferred process a flocculating agent; however, due to the inherent flocculating characteristic of the modified latex, a much reduced load of flocculating agent is required when the latex of the subject invention is employed. This characteristic is due to the bound phosphorus groups which allow the modified latex particle to be destabilized much easier in the presence of fillers with multi-valent ions than conventional latex particles. Further, when the present latex is employed, much higher filler levels are obtained in the composite sheet due to a phosphorus-inorganic filler interaction.

More specifically, when an inorganic filler containing divalent or trivalent metal ions is employed, the phosphorus groups have been found to interact with them. This interaction has been demonstrated by measuring the sedimentation volume of an inorganic filler in water. For example, 20 g of $CaCO_3$ were added to a graduated cylinder and diluted to 100 ml with water. After equilibrating for 2 hours, the amount of sediment that accumulated in the bottom of the cylinder was approximately 17.5 ml. In another graduated cylinder 20 g of $CaCO_3$ were diluted to 100 ml with water and 1 g of the modified latex was added. Again, after equilibrating for 2 hours, the sediment volume was measured. This time the sediment volume was approximately 42 ml. This increased volume can be attributed to an interaction between the $CaCO_3$ and the modified latex.

Composite sheets were prepared using a control latex comprising 70 parts of a latex blend of 54 styrene/45 butadiene/1 fumaric acid and 30 parts of a latex blend of 75.5 styrene/19.5 butadiene/4 hydroxyethyl acrylate/1 fumaric acid versus the modified latex. The percent retention of filler was calculated for both latexes. Various fibers were also employed to determine the modified latexes' effect thereon with respect to retention. All tests were conducted on a basic formula of 45 percent fiber, 50 percent filler ($CaCO_3$), and 5 percent latex. The modified latex formulation employed was from Example II disclosed hereinabove.

The results obtained are tabulated in Table I.

TABLE I

|  | Percent Retention | |
| --- | --- | --- |
| Fiber | Control Latex[1] | Modified Latex[2] |
| Bleached Kraft 50% Softwood/50% Hardwood | 82 | 93 |
| Bleached Kraft Hardwood | 88 | 95 |
| Bleached Kraft Softwood | 84 | 94 |
| Bleached Sulfite Softwood | 91 | 94 |

TABLE I-continued

| | Percent Retention | |
|---|---|---|
| Fiber | Control Latex[1] | Modified Latex[2] |
| Unbleached Kraft Softwood | 88 | 96 |

[1]70(54 styrene/45 butadiene/1 fumaric acid)/30(75.5 styrene/19.5 butadiene/4 hydroxylethyl acrylate/1 fumaric acid).
[2]56.72 styrene/40 Butadiene/3.28 phosphonate copolymer (Example II).

Immediately observable from Table I is that the modified latex showed a higher retention level than the control latex and that the modified latex showed a more consistent percentage of retention independent of the particular fiber employed.

Additional testing was conducted with the modified latexes to determine their self-flocculating characteristic. Usually the preferred process for forming a composite sheet employs a flocculant which has an opposite charge to the ionic stabilization of the latex in order to cause the latex to become colloidally destabilized. However, the subject modified latex has been shown to require less flocculant load while exhibiting excellent retention. In particular, Table II shows the results obtained where a standard latex composition was compared to three modified latexes with various levels of $\alpha,\beta$-ethylenically unsaturated acid comonomer at increasing flocculant levels. The particular flocculants employed are described in Table II. The common recipe employed for the four aqueous dispersions was 45 percent fiber (50/50 hardwood/softwood), 50 percent clay and 5 percent latex. Flocculant was added to each recipe as indicated in Table II. The latex compositions are as indicated in Table III. Table IV contains the retention percentages of inorganic filler by each latex at varying flocculant levels.

TABLE II

| | Flocculant Type and Amount |
|---|---|
| A | 2 lb/ton Polymeric PC[1] plus ½ lb/ton Betz 1260[2] |
| B | 4 lb/ton Polymeric PC[1] plus ½ lb/ton Betz 1260[2] |
| C | 4 lb/ton Polymeric PC[1] plus 1 lb/ton Betz 1260[2] |

[1]Polymeric PC is a cationic copolymer of acrylamide
[2]Betz 1260 is a high molecular weight cationic polyacrylamide.

TABLE III

| | Latex |
|---|---|
| W | 58.5 styrene/40 butadiene/1.5 itaconic acid |
| X | 59 styrene/40 butadiene/1 fumaric acid/2 phosphated alkylphenol ethoxylate |
| Y | 59.5 styrene/40 butadiene/0.5 fumaric acid/2 phosphated alkylphenol ethoxylate |
| Z | 58.75 styrene/40 butadiene/1.25 acrylic acid/2 phosphated alkylphenol ethoxylate |

TABLE IV

| | % Retention of Inorganic Filler at Increasing Flocculant Levels (A to C) | | |
|---|---|---|---|
| Latex | A | B | C |
| W[1] | 68.5 | 78.5 | 82.5 |
| X[2] | 72.0 | 84.0 | 88.5 |
| Y[2] | 78.0 | 89.5 | 93.0 |
| Z[2] | 79.0 | 90.5 | 95.5 |

[1]A typical latex for comparison.
[2]A modified latex of the invention.

The percent retention of filler with respect to flocculant loading shows that the phosphate modified latex at all acid comonomer levels (latexes X, Y and Z) exhibited increased retention. It is further shown that the subject latexes (X, Y and Z) can be employed at lower flocculant loads (A→C increasing levels) while still obtaining equivalent to greatly enhanced retention over the standard latex (W) at increased flocculant loading.

While the flocculating characteristic of the modified latex is especially beneficial in composite sheet manufacture, this inherent destabilizing tendency is not entirely beneficial in a paper coating latex. A paper coating latex instead is generally known in the art to retain a certain degree of stabilization in the presence of inorganic fillers in order to effectively employ it in paper coating operations.

As is well known, paper coating compositions comprise pigments which are inorganic fillers and an adhesive material which consists of a synthetic latex.

This latex composition is applied to the paper by conventional means such as letterpress print roll coater, offset roll coater, size press, air knife and blade coater. After application, the latex composition is dried by any convenient method such as by a current of air and more usually by heated air. The latex employed must, therefore, exhibit a degree of stability in order to provide a homogeneous aqueous dispersion while it is maintained on a particular coating apparatus.

It has been found that when only the phosphate ester type surfactant is used in the manufacture of the subject latex the resulting aqueous dispersion may be too destabilized for convenient use as a paper coating binder. However, when the phosphated surfactant is used in conjunction with an ethylenically unsaturated comonomer, the resulting latex dispersion becomes sufficiently stabilized to be employed as a paper coating composition. The preferred ethylenically unsaturated comonomers being an $\alpha,\beta$-ethylenically unsaturated carboxylic acid or a phosphonic acid derivative. The more preferred $\alpha,\beta$-ethylenically unsaturated carboxylic acids being fumaric acid and acrylic acid. Acrylic acid being the most preferred.

A further discovery with respect to the latex containing phosphated surfactant and copolymerized phosphonate groups is that the increased stabilization provides excellent sheet strength despite the increased filler retention. This phenomena is attributed to a slow down in the flocculation rate which is sufficient to allow a more uniform arrangement of the latex/inorganic filler units. Thus, the more symmetrical packing would have greater structural integrity than a more random or porous packing which would result from a rapidly flocculating system.

The following Table V shows how paper composites formed from copolymer latexes with bound phosphorus surface groups exhibit increased retention of the inorganic filler with little loss in internal bonding strengths of the paper specimen which would not be expected in view of the increased filler levels present.

Testing was conducted on a Scott Model B Intrafiber Bond Tester, manufactured by Scott Testers, Inc.; Providence, R.I. The test procedure followed was in accordance with TAPPI routine control method RC-308. This method is designed to determine the average force in thousandths of a foot pound required to separate a paper specimen, to determine the internal bonding strength of the paper specimen.

For this demonstration, paper composites were prepared using a 45 percent fiber (50 percent hardwood/50 percent softwood), 50 percent clay and 5 percent latex formulation. The latex compositions employed were those from Table III. Internal bonding strength was measured at various retention levels and plotted graphically to compare the four latex compositions at increasing retention levels. The results are as follows:

TABLE V

| Latex | Internal Bonding Strengths* of Paper Specimens Retention Levels | | | |
|---|---|---|---|---|
| | 75% | 80% | 85% | 90% |
| W | 111.5 | 130.0 | — | — |
| X | 93.0 | 111.0 | 124.5 | 128.5 |
| Y | 82.3 | 100.0 | 114.0 | 125.0 |
| Z | 93.0 | 110.0 | 123.0 | 130.0 |

*Internal bonding strengths measured in thousandths of a foot pound required to separate a paper specimen.

The maximum retention of the standard latex, W, was 80 percent and, therefore, no internal bonding values are reported at the 85 and 90 percent retention levels. The subject latexes, X, Y, and Z, obtained significantly better retention levels; however, for purposes of comparison Table V only reports values up to the 90 percent level. It is readily seen that at the 90 percent retention level the subject latexes exhibit greater internal bonding strength than the standard latex, W, at the lower 75 percent retention level. This is also shown for the subject latexes at the 85 percent retention level. This is surprising and unique. Ordinarily, one would expect lower strength values for increasing levels of retention because of the lower binder to filler ratio.

At equivalent retention levels the standard latex showed better strength but this occurred at lower levels of retention which did not take advantage of the invention's capabilities for higher retention. It is to be noted, however, that the invention's internal bonding strength at lower retention levels is not unacceptable and, therefore, the invention can be successfully employed at these levels. The preferred mode of operation, however, would be at the higher retention levels as it is here that the advantages of the subject invention are best realized.

What is claimed is:

1. A modified latex composition containing a phosphorus surface group comprising:
   (a) at least one ethylenically unsaturated synthetic monomer which is emulsion polymerized to form a latex, and
   (b) a phosphorus compound which is intimately bound to the surface of said latex, said phosphorus compound being a phosphonate and/or a phosphate compound.

2. The composition of claim 1 wherein said ethylenically unsaturated synthetic monomer is of the general formula $CH_2=CHR$ wherein R is H, alkyl, aryl, nitrile, ester, acid or halogen.

3. The composition of claim 1 wherein said latex is a copolymer.

4. The copolymer of claim 3 which is styrene-butadiene.

5. The composition of claim 1 wherein said phosphate compound is a phosphated ester surfactant.

6. The composition of claim 1 wherein said phosphorus compound is intimately bound by covalent bonds or adsorption.

7. The composition of claim 1 wherein said phosphorus compound is a mixture comprising:
   (a) a surfactant containing a $—PO(O)_2$ group, and
   (b) an ethylenically unsaturated comonomer.

8. The mixture of claim 7 wherein said surfactant containing a $—PO(O)_2$ group is a phosphated ester.

9. The mixture of claim 7 wherein said ethylenically unsaturated comonomer is an $\alpha,\beta$-ethylenically unsaturated carboxylic acid.

10. The mixture of claim 7 wherein said ethylenically unsaturated comonomer is a derivative of a phosphonic or phosphoric acid.

11. A method for preparing a paper coating composition formed from an aqueous dispersion of at least one inorganic filler, and from about 2 to about 30 percent of a modified latex composition containing a phosphorus surface group comprising:
   (a) at least one ethylenically unsaturated synthetic monomer which is emulsion polymerized to form a latex, and
   (b) a mixture comprising:
      (1) a surfactant containing a $—PO(O)_2$ group, and
      (2) an ethylenically unsaturated comonomer
   wherein said $—PO(O)_2$ group is intimately bound to the surface of said latex.

12. The method of claim 11 wherein said ethylenically unsaturated synthetic monomer is of the general formula $CH_2=CHR$ wherein R is H, alkyl, aryl, nitrile, ester, acid or halogen.

13. The method of claim 11 wherein said latex is a copolymer.

14. The copolymer of claim 13 which is styrene-butadiene.

15. The method of claim 11 wherein said surfactant is a phosphated ester.

16. The method of claim 11 wherein said $—PO(O)_2$ group is intimately bound by covalent bonds or adsorption.

17. The method of claim 11 wherein said ethylenically unsaturated comonomer of said mixture is an $\alpha,\beta$-ethylenically unsaturated carboxylic acid.

18. The method of claim 11 wherein said ethylenically unsaturated comonomer of said mixture is a derivative of a phosphonic or phosphoric acid.

19. The composition of claim 1, wherein said phosphonate compound is covalently bonded to the surface of said latex.

20. The method of claim 18 wherein said derivative of a phosphonic acid is covalently bonded to the surface of said latex.

* * * * *